(12) United States Patent
Dunn et al.

(10) Patent No.: US 6,226,127 B1
(45) Date of Patent: May 1, 2001

(54) OPTICAL IMAGES

(75) Inventors: Paul Dunn, Radlett; Andrew Rowe, Colchester, both of (GB)

(73) Assignee: Fryco Limited, Tyne & Wear (GB)

( * ) Notice: Subject to any disclaimer, the term of this patent is extended or adjusted under 35 U.S.C. 154(b) by 0 days.

(21) Appl. No.: 09/297,789

(22) PCT Filed: Nov. 7, 1997

(86) PCT No.: PCT/GB97/03062

§ 371 Date: Jun. 7, 1999

§ 102(e) Date: Jun. 7, 1999

(87) PCT Pub. No.: WO98/20382

PCT Pub. Date: May 14, 1998

(30) Foreign Application Priority Data

Nov. 7, 1996 (GB) .................................................. 9623214

(51) Int. Cl.$^7$ ............................. G02B 27/10; B42D 15/00
(52) U.S. Cl. .......................... 359/628; 359/620; 359/459; 283/91
(58) Field of Search ...................... 359/619–621, 359/454, 459, 478, 479, 574; 283/91

(56) References Cited

U.S. PATENT DOCUMENTS

| | | | |
|---|---|---|---|
| 3,536,378 | 10/1970 | Bishop | 350/167 |
| 4,588,212 | 5/1986 | Castagnoli | 283/91 |
| 4,715,623 | 12/1987 | Roule et al. | 283/91 |
| 5,032,003 | 7/1991 | Antes | 350/162.18 |
| 5,784,200 | * | 7/1998 | Modegi | 359/657 |

FOREIGN PATENT DOCUMENTS

| | | | |
|---|---|---|---|
| 9002658 | 3/1990 | (WO) | B41M/3/14 |
| 9414621 | 7/1994 | (WO) | B42D/15/00 |
| 9428444 | 12/1994 | (WO) | G02B/5/18 |
| 9429119 | 12/1994 | (WO) | B42D/15/00 |

OTHER PUBLICATIONS

Kettler, J. E., "The Compact Disk as a Diffraction Grating," *American Journal of Physics*, vol. 59, No. 4, pp. 367–368 (Apr. 1991).

* cited by examiner

*Primary Examiner*—Hung Xuan Dang
*Assistant Examiner*—David N. Spector
(74) *Attorney, Agent, or Firm*—Edwin D. Schindler

(57) ABSTRACT

A substrate is arranged to provide at least one optically variable image the substrate has a front surface formed with a plurality of groups of elemental areas, the different said groups of elemental areas corresponding to respective pixels of the image. The different elemental areas of each group are formed with respective sets of grooves or ridges, where the grooves and ridges of different elemental areas of each group are disposed at different orientations in the different elemental areas, such that each elemental area directs light to a viewer from a respective angle of view. For any given angle of view, the image seen by the viewer is made up of light reflected or refracted without interference.

18 Claims, 1 Drawing Sheet

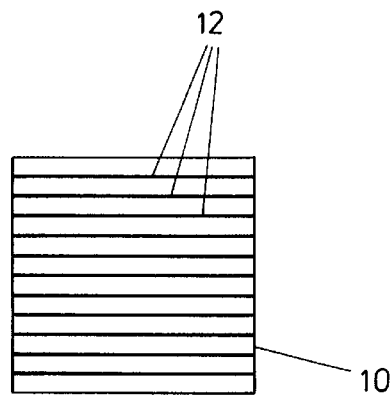
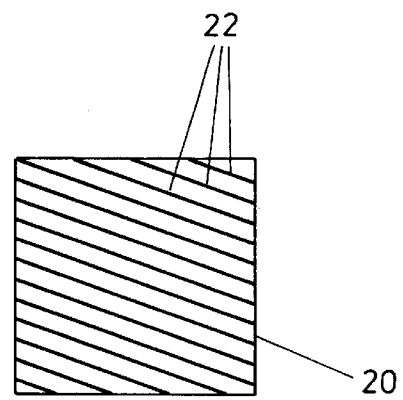
FIG. 1    FIG. 2
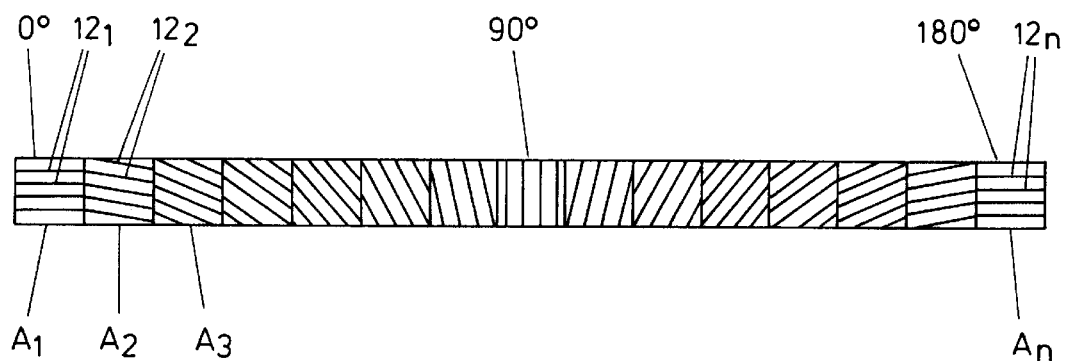
FIG. 3

OPTICAL IMAGES

BACKGROUND OF THE INVENTION

The present invention relates to substrates which provide one or more optical images which vary according to the angle of view in dependence upon microscopic reflection as opposed to diffraction.

There are many applications where such optically variable images are required or desirable: one important application is to provide a security identification on an article of value. Generally hitherto, relatively complicated methods of manufacture have been necessary in order to produce optically variable images, or alternatively these images have been of poor quality or relatively easy to counterfeit.

We have now devised substrates which provide an optically variable image of good quality, yet these substrates can be formed with a complex array of pixels which make them very difficult to counterfeit.

BRIEF SUMMARY OF THE INVENTION

In accordance with the present invention, there is provided a substrate which is arranged to provide at least one optically variable image, the substrate being formed with a plurality of groups of elemental areas, the different groups forming respective image pixels, and the different elemental areas of each group being formed with respective grooves or ridges or sets of grooves or ridges, the grooves or ridges of the different elemental areas of each group being at different orientations.

The substrate may be arranged to be viewed under reflected light, the light being reflected from the grooves or ridges. Alternatively, the substrate may be formed of transparent or partially transparent material and arranged to be viewed by light transmitted through the substrate from its rear, the light being refracted (or refracted and reflected) by the grooves or ridges.

Each elemental area of each pixel directs light to the viewer only for a respective angle of view. Thus, for any given angle of view, the image seen by the viewer is made up of light reflected or refracted from the different pixels, but typically only from one elemental area of each such pixel. As the substrate is turned, different elemental areas of each pixel reflect or refract light to the viewer. In this way, a dynamically changing image is produced.

The grooves or ridges of each elemental area may be parallel to each other, or substantially parallel: in other words, the grooves or ridges may depart somewhat from being absolutely parallel to each other. Also, the grooves or ridges of each elemental area may be straight, or they may be curved. The elemental areas may be square, circular or of any other desired shape. Furthermore, the elemental areas of each group may be arranged in line (i.e. in a linear disposition, whether on a straight or on a curved line), or they may be closely packed together (e.g. in a square or circular zone). In any event, the substrate does not use diffraction effects and there is no interference between the light rays passing from the substrate to the viewer.

The arrangement so far described provides a two-dimensional, variable image. In a modification, a variable image which is at least partly three-dimensional is provided. In this modification, the teachings of our UK patent application No. 9617314.1 are used. Thus, at least some of the elemental areas of at least some of the pixels are each made up of two grooves or ridges, or series of grooves or ridges, forming a stereo pair, the two grooves or ridges or series of grooves or ridges being inclined to each other so as to be viewable by the respective eyes of the viewer (at the relevant angle of view for that elemental area), and thus forming an image of a point at a predetermined distance from the plane of the substrate: this distance is dependent on the spacing and relative angles of the two series of grooves or ridges.

A plurality of such "point" images is provided by those stereo pairs, of different pixels, which are seen by the viewer at the relevant angle of view: the plurality of such point images together form an overall three-dimensional image. As previously described, this image changes with different angles of view.

BRIEF DESCRIPTION OF THE SEVERAL VIEWS OF THE DRAWINGS(S)

Embodiments of the present invention will now be described by way of examples only and with reference to the accompanying drawings, in which:

FIG. 1 is a diagram showing a set of reflective grooves on a substrate:

FIG. 2 is a similar diagram showing a set of reflective grooves on a substrate, but oriented at a different angle; and FIG. 3 is a similar diagram showing a group of elemental areas having grooves of successively different orientations.

DETAILED DESCRIPTION OF THE INVENTION

Reference will first be made to FIGS. 1 and 2 in order to explain principles which are used in substrates in accordance with the present invention. FIG. 1 shows a set of parallel grooves 12 formed in a substrate 10 which is intended to be viewed under reflected light: because the grooves 12 run parallel to the top and bottom edges of the substrate 10, the viewer will only see light reflected from these grooves when the substrate 10 is oriented such that the grooves are horizontal. FIG. 2 shows a set of parallel grooves 22 which are inclined to the top and bottom edges of the substrate 20: the viewer will only see light reflected from these grooves when the substrate 20 is turned through a corresponding angle (about an axis perpendicular to its plane), to bring the grooves 22 to a horizontal orientation.

FIG. 3 shows a group of successive elemental areas $A_1$ to $A_n$, each formed with a set of parallel grooves $12_1$ to $12_n$, but with the grooves of each such element oriented at an angle to the grooves of the preceding element of the group. Thus, as the substrate, on which this group of elements is formed, is turned through 180° in a counterclockwise direction, the successive elements $A_1$ to $A_n$ become visible to the viewer in turn. The group of elements can be used to form one pixel of an image, and the effect is that rotation of the substrate produces, in effect, a dynamic movement of that pixel.

Thus, a substrate in accordance with the invention is formed with a plurality of groups of elemental areas, the different groups forming respective image pixels: the different elemental areas of each group are formed with respective sets of grooves, with the grooves of the different elemental areas of the group being at different orientations within the plane of the substrate. For any given angle of view, the image seen by the viewer is made up of light reflected from the different pixels, but only from one elemental area of each such pixel: the substrate does not use diffraction effects and there is no interference between the light rays passing from the substrate to the viewer. As the substrate is turned or viewed from a changing angle, different elemental areas of each pixel reflect light to the viewer, such that a dynamically changing image is produced.

The resolution of the individual grooves may be as low as 2 micron. Each elemental area may have any desired number of grooves, although as few as one or two grooves may be provided in each such elemental area. In general, each elemental area may be as small as 5 microns but there is no upper limit to its size.

Although square elemental areas are shown, they can in principle be of any desired shape and size. Also, whilst straight grooves are shown, they may instead be curved or of any other shape. Further, the grooves of each elemental area need not be absolutely parallel to each other and may vary in orientation within that elemental area. In other words, the groove can have the property of a vector image or pixel orientated image or any combination of the two.

In a modification, at least some of the elemental area of at least some of the pixels may be arranged to contribute to a three-dimensional image, in accordance with the teachings of our UK patent application No. 9617314.1. Each such elemental area is made up of two series of grooves forming a stereo pair, the two series of grooves being inclined to each other so as to be viewed by the respective eyes of the viewer, and thus forming an image of a point at a predetermined distance from the plane of the substrate. A plurality of such point images is provided by those stereo pairs, of different pixels, which are seen at the relevant angle of view: the plurality of such point images together form an overall three-dimensional image.

Although the principles of the invention have been described with reference to a substrate formed with grooves and to be viewed under reflected light (the light being reflected from the grooves themselves), the substrate may instead be transparent and formed with ridges instead of grooves, for viewing by light transmitted through the substrate and refracted (or both refracted and reflected) by the ridges.

What is claimed is:

1. A substrate which is arranged to provide an optically variable image to a viewer, said image being composed of a plurality of pixels, the substrate having a front surface which is formed with a plurality of groups of elemental areas, with different said groups of elemental areas corresponding to respective pixels of said image, and the different elemental areas of each group being formed with respective grooves or ridges or with respective sets of grooves or ridges, the grooves or ridges of different elemental areas of each group being at different orientations within the plane of said substrate so that, at different orientations of the substrate within said plane, different elemental areas of each said group of elemental areas contribute to the respective pixel of the image seen by the viewer, with said grooves or ridges being arranged to direct light to the viewer at predetermined angles relative to the plane of said substrate, by reflecting light incident on said front surface, without interference occurring between light rays directed to the viewer from the substrate.

2. A substrate as claimed in claim 1, in which at least some of said elemental areas comprise a plurality of said grooves or ridges which are parallel or substantially parallel to each other.

3. A substrate as claimed in claim 1, in which the grooves or ridges of at least some said elemental areas are rectilinear.

4. A substrate as claimed in claim 1, in which the grooves or ridges of at least some said elemental areas are curved.

5. A substrate as claimed in claim 1, in which at least some of said elemental areas are square in shape.

6. A substrate as claimed in claim 1, in which at least some of said elemental areas are circular in shape.

7. A substrate as claimed in claim 1, in which, in at least some said groups, the elemental areas are arranged in a linear disposition.

8. A substrate as claimed in claim 1, in which, in at least some of said groups of elemental areas, said elemental areas are closely packed together.

9. A substrate as claimed in claim 1, in which at least some of the elemental areas of at least some of said groups comprise two grooves or ridges, or two series of grooves or ridges, forming a stereo pair, the two grooves or ridges, or two series of grooves or ridges, being inclined to each other so as to direct light to the respective eyes of the viewer when the viewer views the substrate from a predetermined angle of view.

10. A substrate which is arranged to provide an optically variable image to a viewer, said image being composed of a plurality of pixels, the substrate being formed of transparent material and having a front surface which is formed with a plurality of groups of elemental areas, the different said groups of elemental areas corresponding to respective pixels of said image, and the different elemental areas of each group being formed with respective grooves or ridges or with respective sets of grooves or ridges, the grooves or ridges of the different elemental areas of each group being at different orientations within the plane of said substrate so that, at different orientations of the substrate within its said plane, different elemental areas of each said group of elemental areas contribute to the respective pixel of the image seen by the viewer, with said grooves or ridges being arranged to direct light to the viewer at predetermined angles relative to the plane of said substrate, by refracting light transmitting through said substrate from its rear, without interference occurring between light rays directed to the viewer from the substrate.

11. A substrate as claimed in claim 10, in which at least some of said elemental areas comprise a plurality of said grooves or ridges which are parallel or substantially parallel to each other.

12. A substrate as claimed in claim 10, in which the grooves or ridges of at least some said elemental areas are rectilinear.

13. A substrate as claimed in claim 10, in which the grooves or ridges of at least some said elemental areas are curved.

14. A substrate as claimed in claim 10, in which at least some of said elemental areas are square in shape.

15. A substrate as claimed in claim 10, in which at least some of said elemental areas are circular in shape.

16. A substrate as claimed in claim 10, in which, in at least some said groups, the elemental areas are arranged in a linear disposition.

17. A substrate as claimed in claim 10, in which, in at least some of said groups of elemental areas, said elemental areas are closely packed together.

18. A substrate as claimed in claim 10, in which at least some of the elemental areas of at least some of said groups comprise two grooves or ridges, or two series of grooves or ridges, forming a stereo pair, the two grooves or ridges, or two series of grooves or ridges, being inclined to each other so as to direct light to the respective eyes of the viewer when the viewer views the substrate from a predetermined angle of view.

* * * * *